United States Patent
Tanimura et al.

(10) Patent No.: US 8,593,707 B2
(45) Date of Patent: Nov. 26, 2013

(54) IMAGE READING APPARATUS, IMAGE DATA OUTPUT PROCESSING APPARATUS, AND IMAGE READING METHOD PERFORMING COLOR CORRECTION BASED ON UV AND VISIBLE LIGHT

(75) Inventors: Mihoko Tanimura, Osaka (JP); Kyosuke Taka, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 469 days.

(21) Appl. No.: 12/950,701

(22) Filed: Nov. 19, 2010

(65) Prior Publication Data

US 2011/0122466 A1 May 26, 2011

(30) Foreign Application Priority Data

Nov. 20, 2009 (JP) ................................. 2009-265682

(51) Int. Cl.
*G03F 3/08* (2006.01)
(52) U.S. Cl.
USPC .......................................................... 358/518
(58) Field of Classification Search
None
See application file for complete search history.

(56) References Cited

U.S. PATENT DOCUMENTS

| 7,379,205 | B2 * | 5/2008 | Auslander et al. ............. 358/1.9 |
|---|---|---|---|
| 2005/0073703 | A1 | 4/2005 | Nakane | |
| 2007/0047805 | A1 | 3/2007 | Ohtsu | |
| 2008/0079807 | A1 | 4/2008 | Inuiya et al. | |
| 2008/0225286 | A1 * | 9/2008 | Shibata et al. ................ 356/300 |
| 2009/0296085 | A1 * | 12/2009 | Mestha ......................... 356/319 |

FOREIGN PATENT DOCUMENTS

| CN | 1585495 A | 2/2005 |
|---|---|---|
| CN | 1606331 A | 4/2005 |
| CN | 1925548 A | 3/2007 |
| JP | 9-83735 A | 3/1997 |
| JP | 9-98302 A | 4/1997 |
| JP | 10-107970 A | 4/1998 |
| JP | 10-308880 A | 11/1998 |
| JP | 11-205538 A | 7/1999 |
| JP | 2004-64112 A | 2/2004 |
| JP | 2004-284156 A | 10/2004 |

* cited by examiner

*Primary Examiner* — Jeremiah Bryar
(74) *Attorney, Agent, or Firm* — Birch, Stewart, Kolasch & Birch, LLP

(57) ABSTRACT

Image data $R_{in}$, $G_{in}$, $B_{in}$ are read out from an image on a document, on reception of light reflected by the image after being emitted from a first light source for irradiating the document with visible light. Image data $R_{UV}$, $G_{UV}$, $B_{UV}$ are read out from the image on the document, on reception of light reflected by the image after being emitted from a second light source for irradiating the document with ultraviolet light. A color correction process is performed by reading out color corrected imaged data from a color correction table which stores in advance color corrected image data, which are associated with a combination of (i) image data, which correspond to the image data $R_{in}$, $G_{in}$, $B_{in}$, and image data which correspond to the image data $R_{UV}$, $G_{UV}$, $B_{UV}$. By this, it is possible that even in a case where an image on the document contains a fluorescent image, the fluorescent image be easily and accurately reproduced.

6 Claims, 9 Drawing Sheets

FIG. 10
EXAMPLE IN WHICH IMAGE CONTAINS NO FLUORESCENT COMPONENT
| | $R_{UV}$ | $G_{UV}$ | $B_{UV}$ | UV |
|---|---|---|---|---|
| YELLOW | 246 | 251 | 170 | 200 |
| ORANGE | 254 | 219 | 143 | 200 |
| PINK | 254 | 195 | 223 | 200 |
| LIGHT BLUE | 166 | 212 | 232 | 200 |
| GREEN | 196 | 232 | 178 | 200 |
| C | M | Y | K |
|---|---|---|---|
| 8 | 0 | 176 | 0 |
| 0 | 43 | 194 | 0 |
| 0 | 135 | 0 | 0 |
| 120 | 0 | 28 | 0 |
| 74 | 0 | 163 | 0 |
EXAMPLE IN WHICH IMAGE CONTAINS FLUORESCENT COMPONENT
| | $R_{UV}$ | $G_{UV}$ | $B_{UV}$ | UV |
|---|---|---|---|---|
| YELLOW | 251 | 255 | 192 | 169 |
| ORANGE | 255 | 235 | 162 | 164 |
| PINK | 255 | 230 | 252 | 135 |
| LIGHT BLUE | 169 | 250 | 255 | 136 |
| GREEN | 200 | 255 | 201 | 150 |
| C | M | Y | K |
|---|---|---|---|
| 0 | 0 | 89 | 0 |
| 0 | 43 | 108 | 0 |
| 0 | 102 | 0 | 0 |
| 77 | 0 | 0 | 0 |
| 74 | 0 | 105 | 0 |

IMAGE READING APPARATUS, IMAGE DATA OUTPUT PROCESSING APPARATUS, AND IMAGE READING METHOD PERFORMING COLOR CORRECTION BASED ON UV AND VISIBLE LIGHT

This Nonprovisional application claims priority under 35 U.S.C. §119(a) on Patent Application No. 2009-265682 filed in Japan on Nov. 20, 2009, the entire contents of which are hereby incorporated by reference.

TECHNICAL FIELD

The present invention relates to an image reading apparatus and an image reading method, each for reading out an image on a document so as to create image data from it.

BACKGROUND ART

A variety of techniques for obtaining improved reducibility of a fluorescent image has been proposed for an image reading apparatus that reads out an image on a document so as to create document image data from it.

For example, Patent Literature 1 discloses an image reading apparatus configured as follows. The image reading apparatus includes a visible light source for mainly emitting visible light and an ultraviolet light source for emitting ultraviolet light, and reads out one set of image data from an image on a document by irradiating the document with the visible light only and another set of image data from the image on the document by irradiating the document with the ultraviolet light only. In the image reading apparatus, in a case where an operator selects a color check mode in a reading mode, two sets of the image data are displayed to the operator so that they can be visually compared with each other. Then, the operator performs a color adjustment process in accordance with the visual comparison of the two sets of the image data, so as to determine an adjustment value. The adjustment value is stored in a memory. Thereafter, there is performed, in accordance with the adjustment value, a process of image data that are read out from an image on a document by irradiating the document with the visible light only.

Patent Literature 2 discloses a technique in which (i) an image is outputted by an image output apparatus, in accordance with RGB color chart data, (ii) light reflected by the image is measured in light in an environment in which a document on which the image is formed would be actually observed, (iii) in accordance with the measurement, an output profile for use in a process of an image containing a fluorescent portion is created, and then, the output profile is stored in an image processing apparatus, and (iv) for image data that are read out from an image on a document, a color conversion process from a Lab signal to a RGB signal by use of the output profile is performed in the image processing apparatus, so that improved color reproducibility of the image containing the fluorescent portion is obtained.

Patent Literature 3 discloses a technique in which (i) image data are read out from an image on a document by irradiating the document with ultraviolet light, (ii) a fluorescent color region image in the image data is identified, (iii) for image data that are read out from the image on the document by irradiating the document with visible light only, a color compression process is performed by use of a color compression parameter which is switched between parameters in accordance with the identification of the fluorescent color region image.

Patent Literature 4 discloses a technique in which (i) image data are read out from an image on a document by irradiating the document with ultraviolet light, and a fluorescent color region in the image data is identified, and (ii) for image data that are read out from the image on the document by irradiating the document with visible light, a color conversion process is performed in which a region corresponding to the identified fluorescent color region is color converted by using a fluorescent color—close color conversion table being set in advance.

CITATION LIST

Patent Literature 1

Japanese Patent Application Publication, Tokukaihei, No. 11-205538 A (Publication Date: Jul. 30, 1999)

Patent Literature 2

Japanese Patent Application Publication, Tokukai, No. 2004-64112 A (Publication Date: Feb. 26, 2004)

Patent Literature 3

Japanese Patent Application Publication, Tokukaihei, No. 9-83735 A (Publication Date: Mar. 28, 1997)

Patent Literature 4

Japanese Patent Application Publication, Tokukaihei, No. 9-98302 A (Publication Date: Apr. 8, 1997)

SUMMARY OF INVENTION

Technical Problem

Patent Literatures 1 and 2 disclose the techniques in which a parameter or the like for use in an image process of a fluorescent image is set in advance, based on image data that have been read out from an image on a document by irradiating the document with ultraviolet light. In the techniques disclosed in Patent Literatures 1 and 2, however, the image process of a fluorescent image is performed for image data that are read out from the image on the document by irradiating the document with visible light only. In some cases, the fluorescent image in such image data may not be properly distinguishable from a normal image containing no fluorescent image. Thus, there is a case that color reproducibility is reduced even more.

Fluorescence is a phenomenon that certain wavelength light incident on a sample is absorbed therein and released at a different wavelength. A color of the sample emitting fluorescence light is a mixture of colors of (i) a reflected light component having the same wavelength as the light incident on the sample and (ii) a fluorescent light component released at the different wavelength. Therefore, if image data are read out from an image on a document by irradiating the document with visible light only, no influence of ultraviolet light is reflected in a color indicated in the image data. As such, the color indicated in the image data may be different from a color of the image as would be observed in sunlight having ultraviolet light or in light emitted from a light such as a fluorescent light or the like.

With the techniques disclosed in Patent Literatures 3 and 4, it may be possible that a region containing a florescent component be distinguishable from a region containing no fluorescent component. However, in data that are read out from an image on a document, no information on influence of ultraviolet light is reflected. This poses a limitation that it is impossible to color reproduce an image containing any fluorescent component at good accuracy. This is described in detail as follows. In arrangements according to Patent Literatures 3 and 4, in a case where a document is irradiated with ultraviolet light, a visible light cut filter is placed between a light source and the document so that it prevents visible light from being incident on the document. This, however, weakens an intensity of the ultraviolet light incident on the document. Consequently, an intensity of light received by a light receiving element is so weakened that, while it may be possible that the region containing the fluorescent component be distinguishable from the region containing no fluorescent component, it is impossible that a color characteristic of the fluorescent component be detected at good accuracy. In the arrangements according to Patent Literatures 3 and 4, the document is irradiated also with visible light. In this case, it is considered that the visible light has ultraviolet wavelength light. However, an intensity of the ultraviolet wavelength light relative to the visible light is so weak that it is impossible to detect influence of the fluorescent component at a detection accuracy of a light receiving element that receives the visible light reflected by the document. This poses a limitation that, with the techniques disclosed in Patent Literatures 3 and 4, it is impossible to color reproduce the image containing fluorescent component at good accuracy.

Furthermore, in the techniques disclosed in Patent Literatures 3 and 4, there are necessary (i) a process in which, after image data are read out from an image on a document by irradiating the document with ultraviolet light, a fluorescent image region in the image data is identified, and (ii) a process in which a process parameter is switched between a process parameter for use in a process of the fluorescent image region and a process parameter for use in a process of another region in the image data. This causes a configuration of an image processing apparatus to be more complex, and brings about an increase in process time.

The present invention is made in view of the problem, and an object of the present invention is to provide (i) an image reading apparatus, with which it is possible that even in a case where an image on a document contains a fluorescent image, the fluorescent image be easily and accurately reproduced, (ii) an image data output processing apparatus including the image reading apparatus, and (iii) an image reading method.

Solution to Problem

In order to attain the object, an image reading apparatus of the present invention is an image reading apparatus for reading out an image on a document so as to create image data from it, the image reading apparatus including: a first light source for irradiating the document with visible light; a second light source for irradiating the document with ultraviolet light; a light receiving section for receiving (i) light reflected by the document after being emitted from the first light source and (ii) light reflected by the document after being emitted from the second light source, so as to convert the lights (i) and (ii) to single set of image data or respective sets of image data; a color correction section for performing a color correction process for the single set of image data or the respective sets of image data read out in the light receiving section; and a storage section for storing a color correction table for use in the color correction process, the color correction table associating in advance (a) image data, which correspond to image data that will be read out in the light receiving section by irradiating the document with both the visible light and the ultraviolet light at same time, with (b) color corrected image data for reproducing the image, and the color correction section being configured to perform the color correction process by reading out, from the color correction table, the color corrected image data for the image data that have been read out in the light receiving section by irradiating the document with both the visible light and the ultraviolet light at the same time.

The image reading apparatus configured as such includes: the first light source for irradiating a document with visible light; the second light source for irradiating the document with ultraviolet light; the light receiving section for receiving (i) light reflected by the document after being emitted from the first light source and (ii) light reflected by the document after being emitted from the second light source, so as to convert the lights (i) and (ii) into a single set of image data or respective sets of image data; the color correction section for performing the color correction process for the image data; and the storage section for storing the color correction table for use in the color correction process. The color correction table associates in advance (i) image data, which correspond to image that that will be read out in the light receiving section by irradiating the document with both the visible light and the ultraviolet light at the same time, with (ii) color corrected image data for reproducing the image. The color correction section performs the color correction process by reading out, from the color correction table, the color corrected image data for the image data that have been read out in the light receiving section by irradiating the document with both the visible light and the ultraviolet light at the same time. In the image reading apparatus configured as such, in a case where the image on the document contains a fluorescent image, light incident on the fluorescent image is converted from ultraviolet wavelength light into visible wavelength light. Intensity of the light converted as such is to be reflected in image data that are created in the light receiving section. Thus, by taking this into account, the color correction table is prepared in such a manner that the image on the document can be accurately reproduced. Then, the image data are treated with the color correction process in accordance with the color correction table, so that even in a case where the image on the document contains the fluorescent image, it is possible to easily and accurately reproduce the image on the document.

Advantageous Effects of Invention

As described earlier, an image reading apparatus of the present invention is an image reading apparatus for reading out an image on a document so as to create image data from it, the image reading apparatus including: a first light source for irradiating the document with visible light; a second light source for irradiating the document with ultraviolet light; a light receiving section for receiving (i) light reflected by the document after being emitted from the first light source and (ii) light reflected by the document after being emitted from the second light source, so as to convert the lights (i) and (ii) to single set of image data or respective sets of image data; a color correction section for performing a color correction process for the single set of image data or the respective sets of image data read out in the light receiving section; and a storage section for storing a color correction table for use in the color correction process, the color correction table associating in advance (a) image data, which correspond to image data that will be read out in the light receiving section by irradiating the document with both the visible light and the ultraviolet light at same time, with (b) color corrected image data for reproducing the image, and the color correction section being configured to perform the color correction process by reading out, from the color correction table, the color corrected image data for the image data that have been read out in the light receiving section by irradiating the document with both the visible light and the ultraviolet light at the same time.

An image reading method of the present invention is an image reading method for reading out an image on a document so as to create image data from it, the image reading method including: a light receiving step of receiving (i) light reflected by the image after being emitted from a first light source for irradiating the document with visible light and (ii) light reflected by the image after being emitted from a second light source for irradiating the document with ultraviolet light, so as to convert the lights (i) and (ii) to a single set of image data or respective sets of image data; and a color correction step of performing a color correction process for the single set of image data or the respective sets of image data read out in the light receiving step, the color correction step performing reading out color corrected image data from a color correction table so as to perform the color correction process, the color correction table associating in advance (a) image data, which correspond to image data that will be read out in the light receiving step by irradiating the document with both the visible light and the ultraviolet light at same time, with (b) color corrected image data for reproducing the image.

Therefore, even in a case where the document contains the fluorescent image, it is possible to easily and accurately reproduce the fluorescent image.

BRIEF DESCRIPTION OF DRAWINGS

FIG. 10 is a view showing examples of a color correction table for use in the image reading apparatus discussed with reference to FIG. 9.

DESCRIPTION OF EMBODIMENTS

Figure 2:
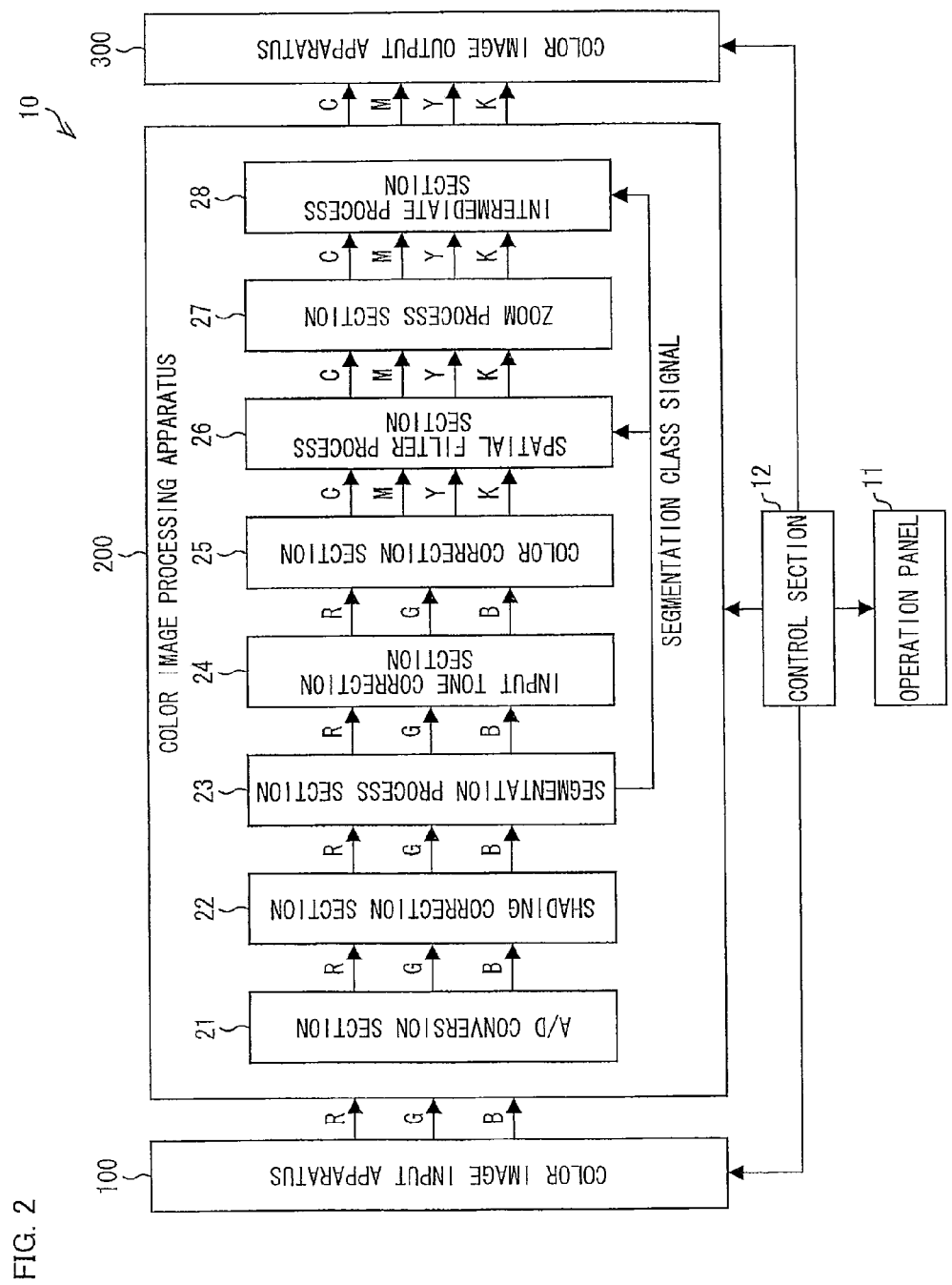
FIG. 2 is a block diagram schematically showing a configuration of an image data output processing apparatus that includes the image reading apparatus discussed with reference to FIG. 1.

One embodiment of the present invention is described below. FIG. 2 is a block diagram schematically showing a configuration of a copying machine (image reading apparatus and image data output processing apparatus) 10.

As shown in FIG. 2, the copying machine 10 includes a color image input apparatus 100, a color image processing apparatus 200, a color image output apparatus 300, an operation panel 11, and a control section 12.

The color image input apparatus 100 is placed on an upper surface of a housing that houses the color image output apparatus 300. The color image input apparatus 100 is provided for reading out an image on a document so as to create image data from it. The image data are sent to the color image processing apparatus 200 and treated with a predetermined image process.

FIG. 3(a) is a cross sectional view showing the color image input apparatus 100. As shown in FIG. 3(a), the color image input apparatus 100 includes (i) a document table 51 made from transparent glass, which document table 51 is a platen, (ii) a DSPF (Duplex Single Pass Feeder: two-sided automatic document feeder) 52 which is a platen cover for automatically feeding and conveying a document to the document table 51, and (iii) a scanner unit (document image reading unit) 50 for reading out, by scanning, an image on the document placed on the document table 51.

The DSPF 52 includes a document tray (which is not shown) for placing thereon a plurality of documents. The DSPF 52 automatically feeds, one by one, the documents to the document table 51. The DSPF 52 further includes (i) a conveyance path for a one-sided document, (ii) a conveyance path for two-sided document, (iii) switching means for switching the conveyance paths, (iv) a sensor group for detecting and controlling a condition of each sheet of the documents that passes through predetermined sections, (v) a control section, and the like. In the DSPF 52 configured as such, the scanner unit 50 reads out an image(s) on one or two sides of a document in conformity with an operator's selection. The DSPF 52 is not described further, provided that a number of patent applications for the DSPF 52 have already been filed, and that the DSPF 52 has already been produced on commercial basis.

The scanner unit 50 includes (i) a light source (lamp reflector assembly) 62 for irradiating a surface of a document with light, (ii) a CCD (charged coupled device) element (photoelectric conversion element) 64 for converting an optical image coming from the document into an electric image signal, (iii) a first scanner unit 60a including a first reflection mirror 63a for reflecting light coming from the document in such a manner as to direct the optical image coming from the document toward the CCD element 64, (iv) a second scanner unit 60b including a second reflection mirror 63b and a third reflection mirror 63c for directing the optical image directed from the first reflection mirror 63a toward the CCD element 64, and (v) an optical lens 63d for causing the optical image coming from the document and then directed from the first through third reflections mirrors 63a through 63c to be focused on the CCD element 64.

Figure 4:
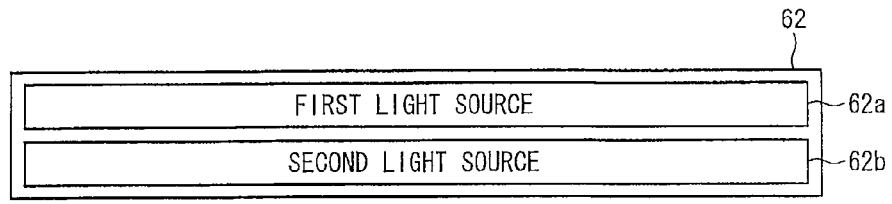
FIG. 4 is a view showing a configuration of a light source (first light source and second light source) shown in the color image input apparatus shown in FIG. 3.

FIG. 4 is a view showing a configuration of the light source 62. As shown in FIG. 4, the light source 62 includes a first light source 62a for emitting visible light and a second light source 62b for emitting ultraviolet light. The first light source 62a can be a light source, e.g., a xenon lamp or the like, which is conventionally for use in an image reading apparatus to irradiate a document with light. The second light source 62b can be, for example, a black light, an ultraviolet LED, or the like. The second light source 62b is set so that emitted ultraviolet wavelength light is incident on a document, and ultraviolet wavelength light to be reflected by the document toward mirrors (which are later described) so as to be directed to the CCD element 64 has light intensity so intense that the CCD element 64 can detect the incoming ultraviolet wavelength light. Regarding the visible wavelength light and the ultraviolet wavelength light emitted from the first and second light sources 62a and 62b, a peak intensity ratio (peak intensity of ultraviolet wavelength light to peak intensity of visible wavelength light) of the ultraviolet wavelength light to the visible wavelength light can be greater than a peak intensity ratio (peak intensity of ultraviolet wavelength light to peak intensity of visible wavelength light) of an ultraviolet wavelength light component to a visible wavelength light component of sunlight or of light which is emitted from a fluorescent light.

Figure 5:
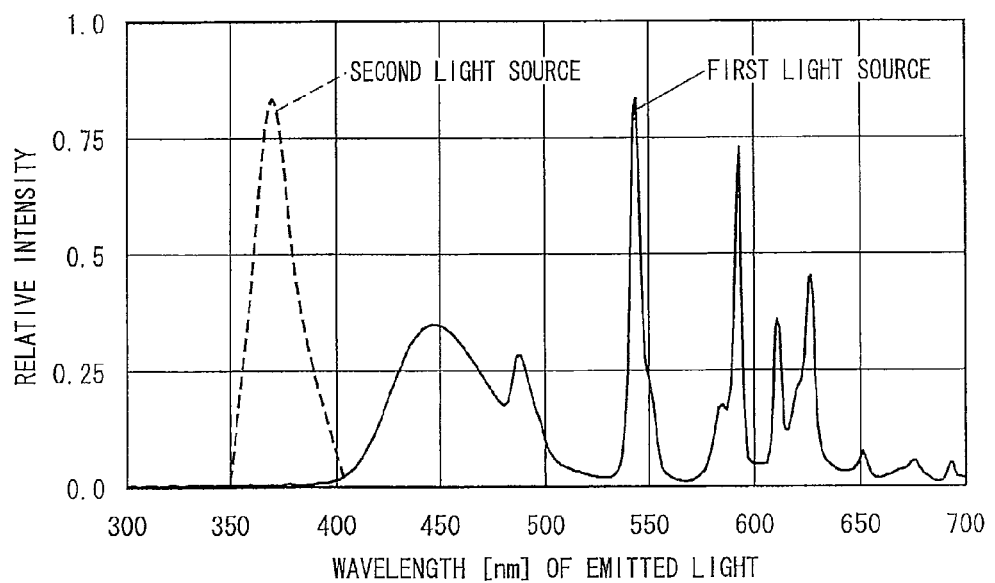
FIG. 5 is a graph showing one example of a spectral characteristic of light emitted from the light source (first light source and second light source) shown in FIG. 4.

FIG. 5 is a graph showing one example of spectral characteristics of the visible wavelength light and the ultraviolet wavelength light emitted from the first and second light source 62a and 62b. As shown in FIG. 5, the first light source 62a has its peak intensity in a visible wavelength band (wavelength band of 400 nm or greater), and the second light source 62b has its peak intensity in a lower wavelength band (ultraviolet wavelength band, wavelength band of less than 400 nm) than the visible wavelength band.

In the color image input apparatus 100, the DSPF 52 and the scanner unit 50 work cooperatively in such a manner that the scanner unit 50 moves along a lower surface of the document table 51 as each sheet of documents is sequentially placed on the document table 51. The scanner unit 50 moving as such reads out an image on each sheet of documents. The first scanner unit 60a and the second scanner unit 60b, in particular, are scan controlled so that the first scanner unit 60a moves along the document table 51 in a horizontal direction at a given speed V, and the second scanner unit 60b moves in a direction parallel with the horizontal direction at speed V/2.

Thus, each line of the image on the document placed on the document table 51 is sequentially focused on the CCD element 64. It is therefore possible that the image on the document be read out.

The DSPF 52 of the color image input apparatus 100 is connected to a hinge member (which is not shown) at one end, so as to be moved as if a cover openable and closable with respect to the document table 51 by a turn of the hinge member. The color image input apparatus 100 further includes an opening/closing detection sensor (which is not shown) for detecting opening or closing of the DSPF 52.

Figure 3:
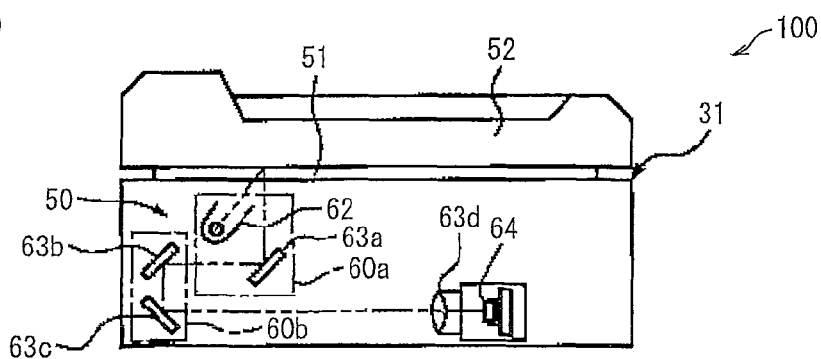
FIG. 3(a) is a cross sectional view showing a color image input apparatus provided in the image reading apparatus discussed with reference to FIG. 1.
FIG. 3(b) is a cross sectional view showing the color image input apparatus provided in the image reading apparatus discussed with reference to FIG. 1.
FIG. 3(c) is cross sectional view showing the color image input apparatus provided in the image reading apparatus discussed with reference to FIG. 1.
Figure 3:
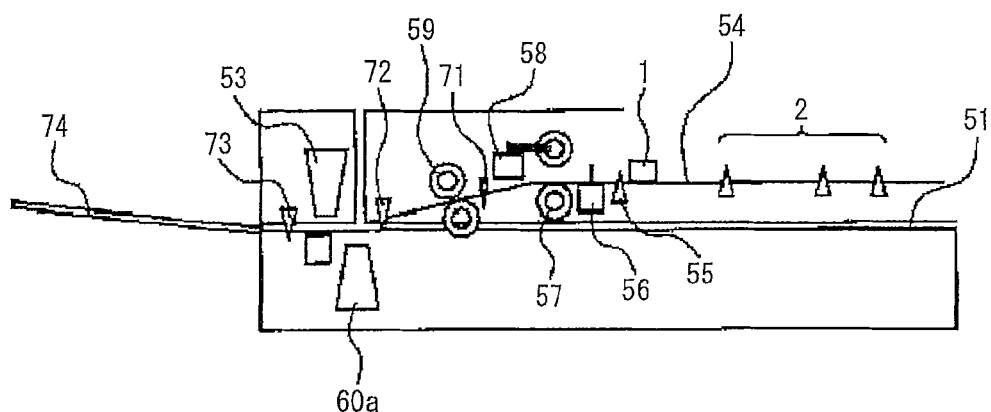
Figure 3:
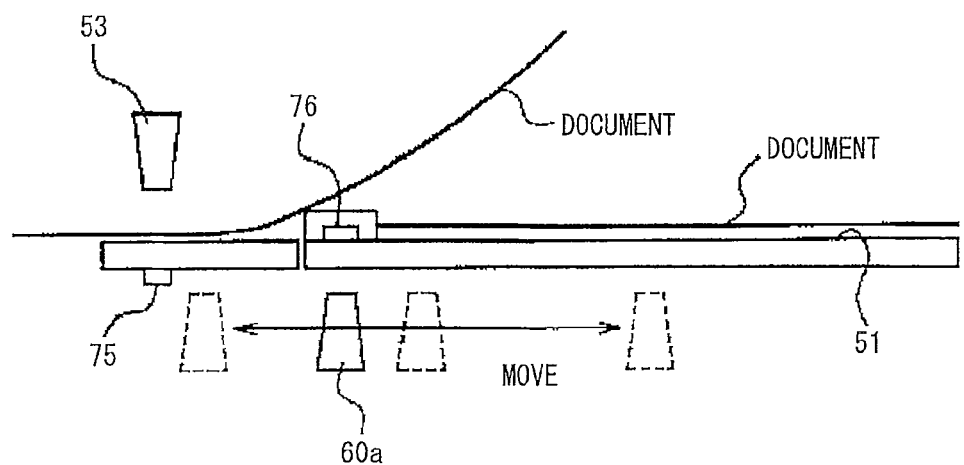

FIG. 3(b) is a cross sectional view showing the color image input apparatus 100. As shown in FIG. 3(b), the color image input apparatus 100 includes optical systems above and below a document table 51. That is, the color image input apparatus 100 includes the scanner unit (first reading optical section) 50 provided below the document table 51 and the second reading optical section 53 provided above the document table 51. The second reading optical section 53 is fixed to the DSPF 52 and remains at a fixed position with respective to the document table 51. For an easy explanation, of members of the scanner unit 50, only the first scanner unit 60a is shown in FIG. 3.

In a case where the color image input apparatus 100 performs two-sided automatic document reading, the scanner unit 50 is moved to a position (first document reading position) which is shown in FIG. 3(b). Thus, images on two sides of a document being fed by the DSPF 52 can be read out, at same time, by the scanner unit 50 and the second reading optical section 53, respectively.

This is described in more detail as follows. In a case where the color image input apparatus 100 automatically reads out images on two sides of a document, at first, a document placement detection sensor 55 detects a document placed on a document table tray 54 of the DSPF 52. In response to the detection by the document placement detection sensor 55, a control section (which is not shown) of the color image input apparatus 100 opens a document stopper 56 and drives a paper feeding roller 57, a sheet pickup nail 58, and a registration roller 59, so that the first document reading position. As the document passes through between the first scanner unit 60a of the scanner unit 50 and the second reading optical section 53, images on two sides of the document are read out by the scanner unit 50 and the second image reading section 53, respectively. Then, the document for which image reading has been performed is discharged to a paper output tray 74.

The DSPF 52 includes (i) a sensor 71 provided upstream of a registration roller 59 with respect to a document conveyance direction, (ii) a document end detection sensor 72 provided upstream of a second reading optical section 53 with respect to the document conveyance direction, and (iii) a paper output sensor 73 provided downstream of the scanner unit 50 with respect to the document conveyance direction.

Also, as shown in FIG. 3(c), the DSPF 52 is provided with white boards 75 and 76 which are bases for shading correction. FIG. 3(c) is a view showing operations that are performed by the color image input apparatus 100 at time when the shading correction is performed.

The white board 75 is provided, on a lower surface of glass of the document table 51, at the first document reading position. The white board 76 is provided, above an upper surface of the glass of the document table 51, at the second document reading position. At time when the shading correction is performed, the scanner unit 50 is moved to the second document reading position, and reads out the white board 76. A result of the reading is sent to the color image processing apparatus 200, together with a result of reading of the white board 75 by the second reading optical section 53. Then, the results of the reading are used in a shading correction process that is performed by the shading correction section 22 (which is later described).

As shown in FIG. 2, the color image processing apparatus 200 includes an A/D conversion section 21, a shading correction section 22, a segmentation process section 23, an input tone correction section 24, a color correction section 25, a spatial filter process section 26, a zoom process section 27, and an intermediate process section 28.

The A/D conversion section 21 receives, from the color image input apparatus 100, (i) analogue RGB signals (RGB image data ($R_{in}$, $G_{in}$, $B_{in}$) which are obtained, based on light coming from a document that is irradiated with the visible light emitted from the first light source 62a) and (ii) analogue RGB signals (RGB image data ($R_{UV}$, $G_{UV}$, $B_{UV}$) which are obtained, based on light coming from the document that is irradiated with both the visible light and the ultraviolet light emitted from the first and second light sources 62a and 62b). On reception, the A/D conversion section 21 converts the analogue RGB signals into respective digital RGB signals, and then outputs the digital RGB signals to the shading correction section 22.

For the digital RGB signals sent from the A/D conversion section 21, the shading correction section 22 performs a removal process for removing distortions caused due to an illumination system, a focusing system, and an imaging system. Then, the shading correction section 22 outputs the digital RGB signals for which the removal process has been performed to the segmentation process section 23.

The segmentation process section 23 classifies, based on at least one of the digital RGB signals ($R_{in}$, $G_{in}$, $B_{in}$) and the digital RGB signals ($R_{UV}$, $G_{UV}$, $B_{UV}$), each pixel of the input image into a black text region, a color text region, a halftone region, or a printing paper photograph (continuous tone region) region. Then, the segmentation process section 23 sends, to the spatial filter process section 26 and the intermediate process section 28, a segmentation signal which indicates, based on a result of the classification, a region into which the pixel has been classified. Also, the segmentation process section 23 relays the image data inputted from the shading correction section 22 to the input tone correction section 24.

The input tone correction section 24 receives the digital RGB signals ($R_{in}$, $G_{in}$, $B_{in}$) and the digital RGB signals ($R_{UV}$, $G_{UV}$, $B_{UV}$) from which the distortions have been removed in the shading correction section 22, and converts them into respective signals, such as density signals or the like, which are easily processable in an image process system employed in the color image processing apparatus 200. Also, the input tone correction section 24 treats the image data with image quality adjustment processes for performing removal of a basic density, adjustment of contrast, or the like. Then, the input tone correction section 24 outputs the image data for which the above processes have been performed to the color correction section 25.

The color correction section 25 performs, for the image data inputted from the input tone correction section 24, removal of color impurity in accordance with a spectral characteristic of a CMYK (C: cyan, M: magenta, Y: yellow, K: black) colorant including an unnecessary absorption component. By this, it is possible that color reproduction of the image be accurate. Also, the color correction section 25 performs a color correction process for the image data inputted from the input tone correction section 24. By this, it is possible that the fluorescent image on the document be accurately reproduced.

Figure 11:
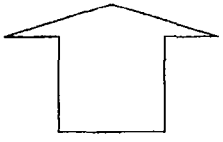
FIG. 11 is a view showing examples of a color correction table for use in the image reading apparatus discussed with reference to FIG. 1.

This is described in detail as follows. The color correction section 25 receives two sets of the RGB image data ($R_{in}$, $G_{in}$, $B_{in}$, and $R_{UV}$, $G_{UV}$, $B_{UV}$), former one of which ($R_{in}$, $G_{in}$, $B_{in}$) has been obtained from the reflected light of the document that has been irradiated with the light emitted from the first light source, whereas latter one of which ($R_{UV}$, $G_{UV}$, $B_{UV}$) has been obtained from the reflected light of the document that has been irradiated with the lights emitted from the first and second light sources 62a and 62b. The color correction section 25 includes a storage section (which is not shown) that stores a color correction table which associates in advance (i) a combination of values $R_{in}$, $G_{in}$, $B_{in}$ and value $R_{UV}$, $G_{UV}$, $B_{UV}$ with (ii) color corrected CMYK values. Thus, the color correction section 25 reads out CMYK output values from the color correction table in accordance with the combination of the input values $R_{in}$, $G_{in}$, $B_{in}$ and the input values $R_{UV}$, $G_{UV}$, $B_{UV}$. Then, the color correction section 25 sends the CMYK output values to the spatial filter process section 26. In order that the color correction table is created, for example, a variety of fluorescent images (sample images) are read out by irradiating them with the lights emitted from the first and second light sources 62a and 62b. Regarding values $R_{in}$, $G_{in}$, $B_{in}$ and values $R_{UV}$, $G_{UV}$, $B_{UV}$ of read out image data, relationships with CMYK values for allowing good color reproduction of the fluorescent images are determined through experiments in advance. As such, the color correction table should be created, based on the relationships. FIG. 11 shows one example of the color correction table.

Since the value $R_{UV}$, $G_{UV}$, $B_{UV}$ are obtained from the light reflected by the document that has been irradiated with the visible light and the ultraviolet light emitted from the first and second light sources 62a and 62b, influence of the fluorescent component are sufficiently reflected in the values $R_{UV}$, $G_{UV}$, $B_{UV}$. Therefore, it is possible that the color correction process be performed, by taking into account both the light reflected by the document that has been irradiated with the visible light emitted from the first light source 62a, and the light reflected by the document that has been irradiated with the ultraviolet wavelength light. By the color correction process performed as such, it is possible to obtain image data in which the influence of the fluorescent component is reflected with high accuracy and which allows high color reproducibility.

Figure 6:
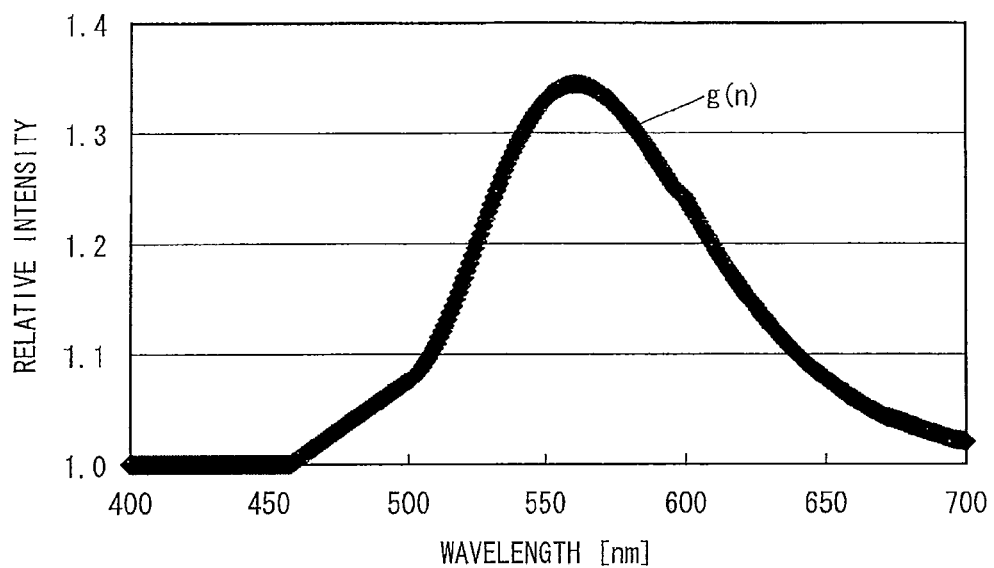
FIG. 6(a) is a graph showing (i) intensity of received wavelength of light coming from a fluorescent image that is irradiated with ultraviolet light, in relative to (ii) intensity of received wavelength of light coming from the fluorescent image that is irradiated with only visible wavelength light.
FIG. 6(b) is a graph showing (i) a sensitivity characteristic of a light receiving element that receives light coming from the same fluorescent image as shown in FIG. 6(a) that is irradiated only with visible light, and (ii) a sensitivity characteristic of a light receiving element that receives light coming from the fluorescent image that is irradiated with visible light and ultraviolet light.
Figure 6:
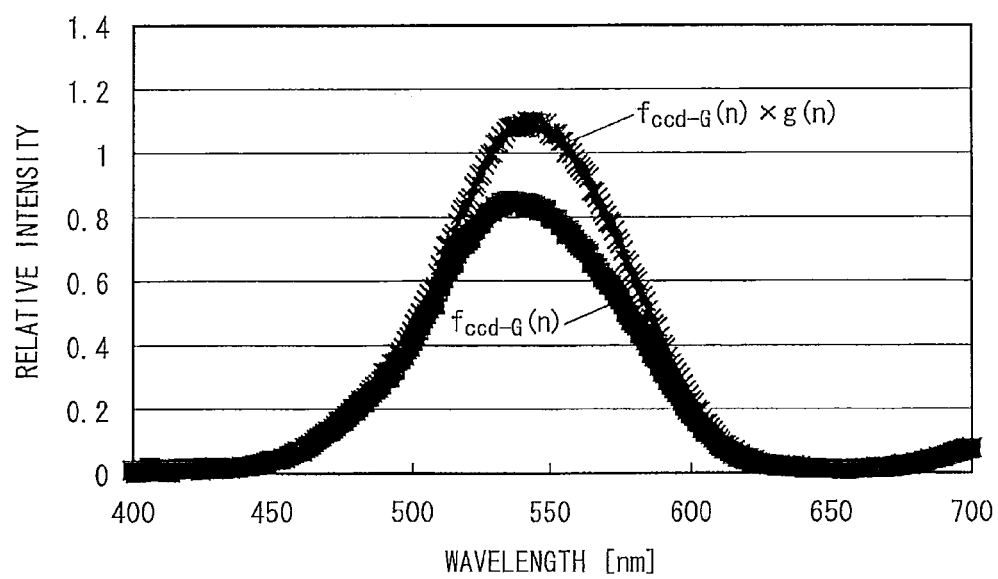

FIG. 6(a) is a graph showing one example of relative intensity (intensity of wavelength shift by fluorescent light) g(n) of (i) a received wavelength of light coming from a green fluorescent image on a document that is irradiated with ultraviolet wavelength light, with respective to (ii) a received wavelength of light reflected by the green fluorescent image on the document that is irradiated with visible wavelength light. n of g(n) indicates a wavelength of light incident on the green fluorescent image.

As shown in FIG. 6(a), the ultraviolet wavelength light incident on the green fluorescent image on the document is converted in wavelength, in the green fluorescent image, and outputted. As a result, in the example shown in FIG. 6(a), relative intensity (relative intensity to the light reflected from the green fluorescent image on the document that is irradiated with the visible light) of the ultraviolet wavelength light coming from the green fluorescent image is approximately 1.35 times greater in a bandwidth near a wavelength of 550 nm.

FIG. 6(b) is a graph showing (i) a sensitivity characteristic $f_{ccd-g}(n)$ of a G (green) light receiving element CCD_G of the CCD element 64 which G light receiving element CCD_G receives light reflected by a same green fluorescent image as in FIG. 6(a) which is irradiated with the visible wavelength light emitted from the first light source 62a, and (ii) a sensitivity characteristic $f_{ccd-g}(n) \times g(n)$ of the G light receiving element CCD_G which receives light coming from the green fluorescent image that is irradiated with the visible wavelength light and the ultraviolet wavelength light emitted from the first and second light sources 62a and 62b. Output values of the G light receiving element CCD_G are determined by the following equations:

$$G_{in} = \int f_{CCD-G}(n)dn$$

$$G_{UV} = \int \{f_{CCD-G}(n) \times g(n)\}dn.$$

As is clear in FIG. 6(b), in a case where the document contains the fluorescent image, a difference between values $G_{in}$ and $G_{UV}$ is greater. This holds true for other colors than G, i.e., R and B. Thus, in the present embodiment, a color correction process is performed, by taking into account both the values $R_{in}$, $G_{in}$ and $B_{in}$ and the values $R_{UV}$, $G_{UV}$, $B_{UV}$. By this, in the present embodiment, it is possible to improve color reproducibility of the fluorescent component.

In the present embodiment, RGB color spatial data are directly converted into CMYK color spatial data. However, the present embodiment is not limited this. For example, the RGB color spatial data can be converted into color spatial data (e.g., Lab color spatial data or the like) other than CMYK color spatial data, which are then converted into CMYK color spatial data. In this case, for example, conversion from the RGB color spatial data into Lab color spatial data can be performed by using a color correction table that associates a combination of the values $R_{in}$, $G_{in}$, $B_{in}$ and the values $R_{UV}$, $G_{UV}$, $B_{UV}$ with Lab color spatial output values. A detail of the processes performed in the color correction section 25 is later described.

The spatial filter process section 26 performs, for the image data of the CMYK signal inputted from the color correction section 25, a spatial filter process (enhancement process and/or smoothing process) by a digital filter in accordance with the segmentation class signal. Thus, a spatial frequency characteristic of the image data of the CMYK signal can be corrected. This can bring a reduction in blurring and graininess retardation of output image.

The zoom process section 27 zooms up or down the image data in response to a user's instruction inputted via the operation panel 11 or the like.

Similarly to the spatial filter process section 26, the intermediate process section 28 performs a predetermined process for the image data of the CMYK signal, in accordance with the segmentation class signal. Then, the image data of the CMYK signal for which the predetermined process has been performed are outputted to the color image output apparatus 300. This is described as to, for example, a region of an image which has been classified into the text region by the segmentation process section 23. In order that reproducibility of a black or colored text is improved, the spatial filter process section 26 increases an enhancement amount of a high frequency component in the region by an edge enhancement process of the spatial filter process. Further, in the intermediate process section 28, a binarization process or a multi-level dithering process on a high-resolution screen suitable for reproduction of the high frequency component is selected. Now, the same is described as to a region of the image which has been classified into the halftone region by the segmentation process section 23. The spatial filter process section 26 performs, for the region, a low-pass filter process for removing an input component. Subsequently, the intermediate process section 28 performs, for image data of a CMYK signal, an output tone correction process for converting a signal, such as a density signal or the like, into a halftone area ratio that is a characteristic value used by the color image output apparatus 300. After this, the intermediate process section 28 performs, for the image data of the CMYK signal, a tone reproduction process (halftone production) for eventually segmenting the image into pixels and thereby allowing tone reproduction of the individual pixels. Now, the same is described as to a region of the image which has been classified into the photograph region by the segmentation process section 23. For the region, a binarization process or a multi-level process on a screen specifically suitable for tone reproduction is performed.

The color image output apparatus (image output section) 300 is provided for performing an output process for the image data inputted from the color image processing apparatus 200. In the present embodiment, the color image output apparatus 300 forms (prints) an image on a recording material in accordance with the image data. A configuration of the color image output apparatus 300 is not particularly limited. As such, the color image output apparatus 300 can be, for example, an image forming apparatus of an electrophotographic printing type, an image forming apparatus of an ink jet type, or the like. The configuration of the color image output apparatus 300 is neither limited to a configuration in which an image is formed on a recording material in accordance with image data. As such, for example, the color image output apparatus 300 can be configured so as to cause a display device to display an image in accordance with image data, to send image data to another apparatus, or to store (file) image data in a recording medium.

The operation panel 11 includes (i) a display section for displaying information to a user in response to an instruction of the control section 12, and (ii) an input section for receiving an input of a user's instruction and sending it to the control section 12.

The control section 12 is provided for controlling operations of the respective sections of the copying machine 10.

The operation panel 11 includes the display section, e.g., a liquid crystal display or the like, and a setup key (neither the display section nor the setup key is shown). The operation panel 11 displays information on the display section in accordance with an instruction of the control section 12. Also, the operation panel 11 sends, to the control section 12, information which has been inputted by a user via the setup key.

The control section 12 includes, for example, CUP (central processing unit) or the like. The control section 12 controls the operations of the respective sections of the copying machine 10, in accordance with a program or data stored in ROM or the like memory (which is not shown), information inputted via the operation panel 11, or the like.

Figure 1:
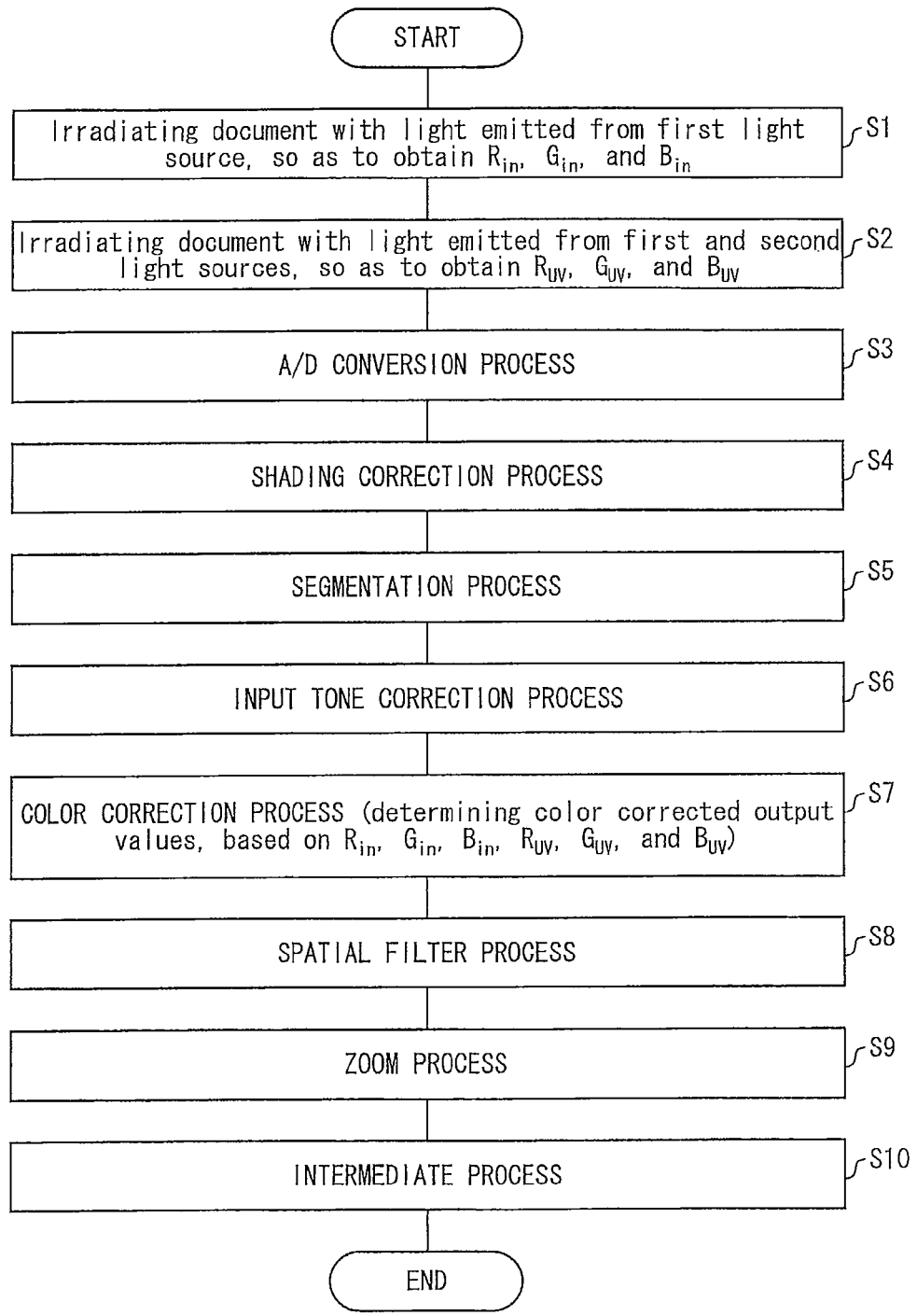
FIG. 1 is a flow chart showing a flow of processes to be performed in an image reading apparatus at time of image reading, in accordance with one embodiment of the present invention.

FIG. 1 is a flow chart showing a flow of processes performed in the copying machine 10 at time when image reading is performed.

As shown in FIG. 1, at a first step of the processes, the control section 12 performs: turning on the first light source 62a of the color image input apparatus 100 so that a document is irradiated with visible wavelength light; and causing a CCD element 64 to detect light reflected by the irradiated document so as to create image data $R_{in}$, $G_{in}$, $B_{in}$ (S1).

Then, the control section 12 performs: turning on both the first and second light sources 62a and 62b of the color image input apparatus 100 so that the document is irradiated with visible wavelength light and ultraviolet wavelength light at the same time; and causing the CCD element 64 to detect light coming from the irradiated document so as to create image data $R_{UV}$, $G_{UV}$, $B_{UV}$ (S2).

After the step S2, the control section 12 causes the A/D conversion section 21 of the color image processing apparatus 200 to perform the A/D conversion process for the image data $R_{in}$, $G_{in}$, $B_{in}$ and the image data $R_{UV}$, $G_{UV}$, $B_{UV}$ (S3). Subsequently, the control section 12 causes the shading correction section 22 to perform the shading correction for the image data $R_{in}$, $G_{in}$, $B_{in}$ and the image data $R_{UV}$, $G_{UV}$, $B_{UV}$ (S4), and then the segmentation process section 23 to perform the segmentation process for the image data $R_{in}$, $G_{in}$, $B_{in}$ and the image data $R_{UV}$, $G_{UV}$, $B_{UV}$ (S5). After this, the control section 12 causes the input tone correction section 24 to perform the input tone correction process for the image data $R_{in}$, $G_{in}$, $B_{in}$ and the image data $R_{UV}$, $G_{UV}$, $B_{UV}$ (S6).

After the step S6, the control section 12 causes the color correction section 25 to perform the color correction process for the image data $R_{in}$, $G_{in}$, $B_{in}$ and the image data $R_{UV}$, $G_{UV}$, $B_{UV}$ (S7). Specifically, the color correction section 25 reads out color corrected values from the color correction table in accordance with the values $R_{in}$, $G_{in}$, $B_{in}$ obtained at the step S1 and the values $R_{UV}$, $G_{UV}$, $B_{UV}$ obtained at the step S2, so as to determine output values. Then, the color correction section 25 sends the output values to the spatial filter process section 26.

After the step S7, the control section 12 causes the spatial filter process section 26 to perform the spatial filter process for the output values (S8), and then the zoom process section 27 to perform the zoom process for the output values (S9). Subsequently, the control section 12 causes the intermediate process section 28 to perform the intermediate process for the output values (S10). After the step S10, the control section 12 finishes the process.

As described above, in the copying machine 10 of the present embodiment, the color corrected output values are determined in accordance with a combination of two sets of (i) the image data $R_{in}$, $G_{in}$, $B_{in}$, which have been obtained by irradiating the document with the visible wavelength light emitted from the first light source, and (ii) the image data $R_{UV}$, $G_{UV}$, $B_{UV}$, which have been obtained by irradiating, at the same time, the document with the visible wavelength light and the ultraviolet wavelength light emitted from the first and second light sources 62a and 62b.

In the image data $R_{UV}$, $G_{UV}$, $B_{UV}$, therefore, there is reflected the intensity of the ultraviolet wavelength light which has been converted to the visible wavelength light in the fluorescent image. Thus, by determining output values of color corrected image data accordingly, it is possible to improve reproducibility of the fluorescent image.

In the present embodiment, at time when the image reading is performed, there are performed two steps of processes, in one of which a document is irradiated with the visible wavelength light emitted from the first light source 62a, and in the other one of which the document is irradiated with the visible wavelength light and the ultraviolet wavelength light emitted from the first and second light sources 62a and 62b, at the same time. However, the present embodiment is not limited to this. As such, a user may input, for example, via the operation panel 11, information on whether a document contains a fluorescent image or not. In a case where the document contains no fluorescent image, the document is irradiated with only the visible light emitted from the first light source 62a so that image data $R_{in}$, $G_{in}$, $B_{in}$ are obtained. Then, a color correction process is performed, based on the image data $R_{in}$, $G_{in}$, $B_{in}$.

Second Embodiment

Another embodiment of the present invention is described. For easy explanations, members having the same functions as discussed in First Embodiment are given the same reference numerals as given in First Embodiment, and explanations thereof are omitted.

The present embodiment is different from First Embodiment in the following (i) through (iii): (i) a CCD element 64 of a color image input apparatus 100 includes a UV (ultraviolet light) light receiving element in addition to R, G, and B light receiving elements, (ii) at time when an image on a document is read out, the document is irradiated, at one time only, with both light emitted from a first light source 62a and light emitted from a second light source 62b, and (iii) color correction is performed in accordance with $R_{UV}$, $G_{UV}$, $B_{UV}$, and UV image data which are obtained, based on light coming from the document being irradiated as such.

Figure 7:
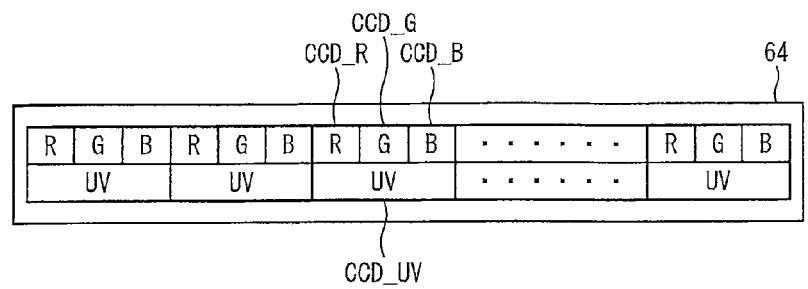
FIG. 7(a) is a view showing a configuration of a light receiving element provided in a color image input apparatus in an image reading apparatus of another embodiment of the present invention.
FIG. 7(b) is a view showing a modified example of the configuration of the light receiving element provided in the color image input apparatus in the image reading apparatus of the embodiment of the present invention.
Figure 7:
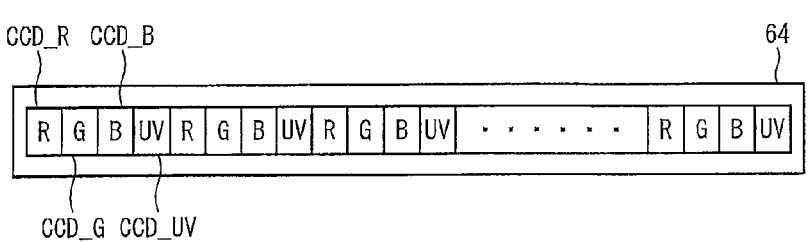

FIG. 7(a) is a view showing a configuration of the CCD element 64 provided in the color image input apparatus 100 of the present embodiment. As shown in FIG. 7(a), the CCD element 64 includes (i) R (red), G (green), and B (blue) light receiving elements (visible light receiving elements) CCD_R, CCD_G, and CCD_B each for receiving corresponding one of R, G, and B wavelength lights and converting it into an electric signal, and (ii) a UV (ultraviolet light) light receiving element (ultraviolet light receiving element) CCD_UV for receiving UV and converting it into an electric signal. In the example shown in FIG. 6(a), the UV light receiving element CCD_UV has a large light receiving area than that of any of the R, G, and B light receiving elements CCD_R, CCD_G, and CCD_B. As such, the UV light receiving element CCD_UV can receive, with high sensitivity, incoming ultraviolet wavelength light which has been reflected by a document and directed from mirrors so as to be incident on the CCD element 64. However, the present embodiment is not limited to this. As such, the R, G, B, and UV light receiving elements CCD_R, CCD_G, CCD_B, and CCD_UV can be arranged in a different way than that of the example shown in FIG. 7(a). For example, as shown in FIG. 7(b), the R, G, B, and UV light receiving elements CCD_R, CCD_G, CCD_B, and CCD_UV can have light receiving areas identical with one another.

Figure 8:
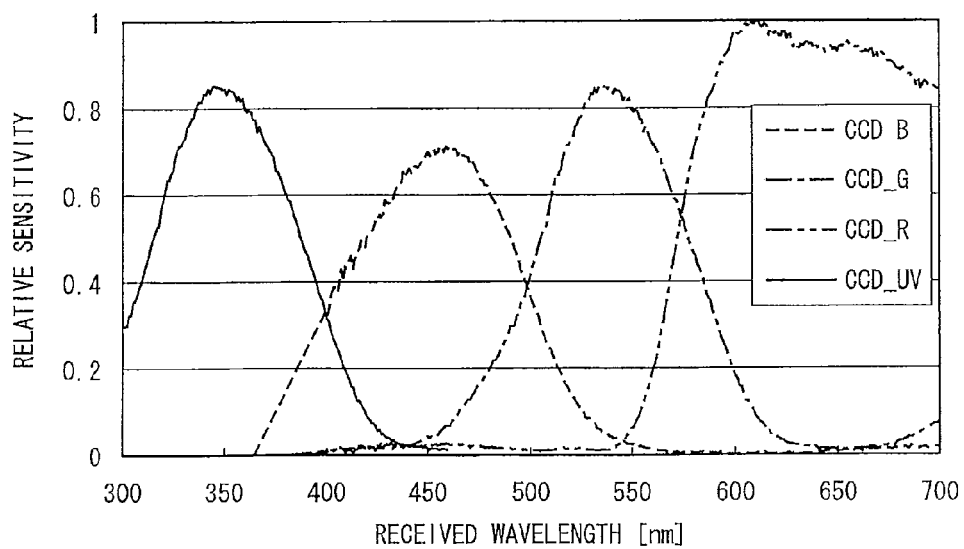
FIG. 8 is a graph showing sensitivity characteristics of the light receiving elements shown in FIGS. 7(a) and 7(b).

FIG. 8 is a graph showing light-receiving sensitivities of the R, G, B, and UV light receiving elements CCD_R, CCD_G, CCD_B, and CCD_UV. As shown in FIG. 8, the R light receiving element CCD_R has its peak light-receiving sensitivity in a red wavelength, the G light receiving element CCD_G has its peak light-receiving intensity in a green wavelength, the B light receiving element CCD_B has its peak light-receiving intensity in a blue wavelength, and the UV light receiving element CCD_UV has its peak light-receiving intensity in an ultraviolet wavelength.

The RGB image data read out in the CCD element 64 (which are electric signals converted from light by the respective corresponding light receiving elements) are outputted to the color image processing apparatus 200. In a case where a two-sided reading mode is selected, image data, which are read out from an image on a lower side of the document by the CCD element 64, are outputted to the color image processing apparatus 200, together with image data which are read out from an image on an upper side of the document by the second reading optical section 53. The second reading optical section 53 can be configured similarly to the reading section 70 so that (i) it includes a first light source for emitting visible light, a second light source for emitting ultraviolet light, and light receiving elements each for receiving corresponding one of R, G, N, and UV wavelength lights and converting it into an electric signal, and that (ii) RGB and UV electric signals are inputted to the color image processing apparatus 200.

Figure 9:
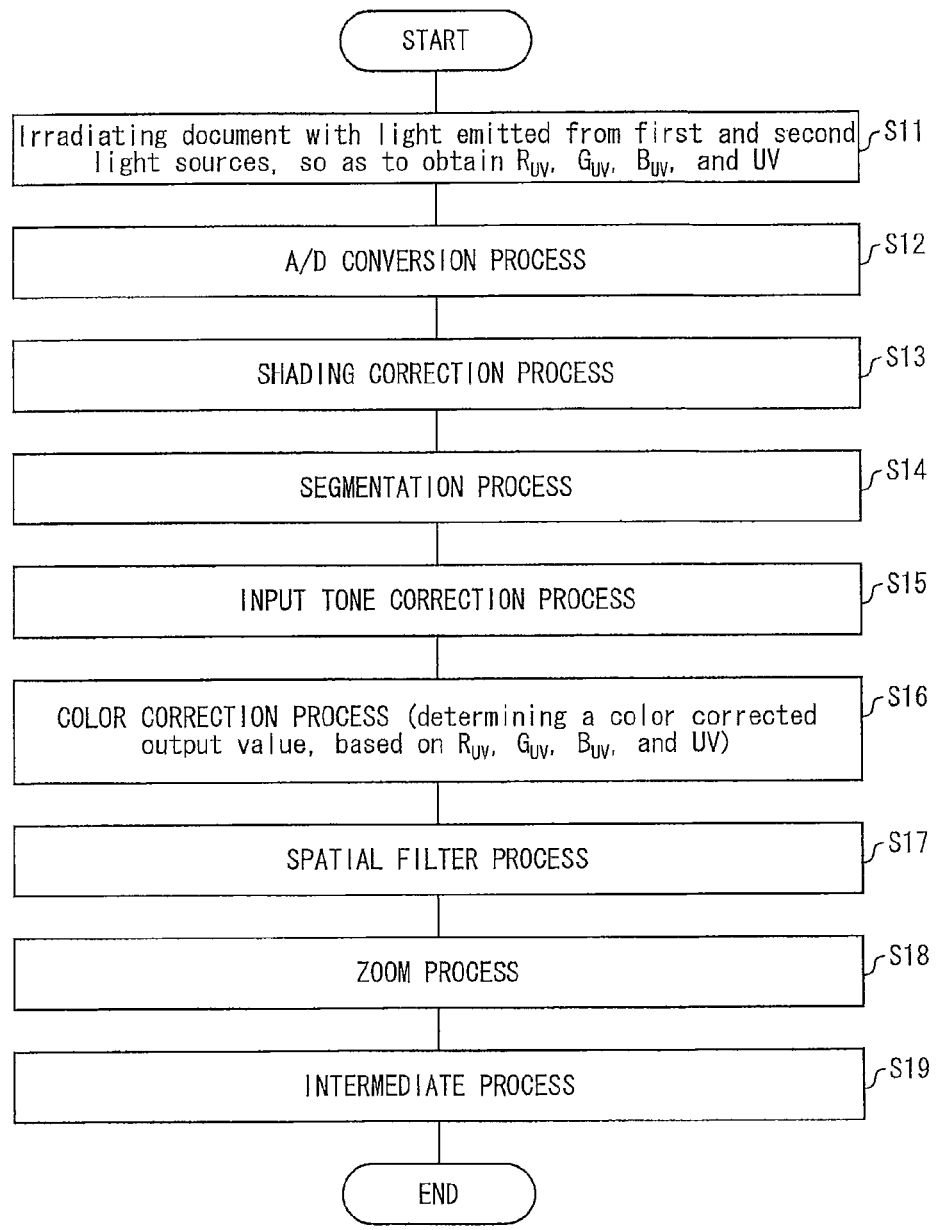
FIG. 9 is a flow chart showing a flow of processes to be performed, at time of image reading, in the image reading apparatus that includes the light receiving elements shown in FIG. 7(a) or 7(b).

FIG. 9 is a flow chart showing a flow of processes that are performed in a copying machine 10 of the present embodiment at time when an image on a document is read out.

As shown in FIG. 9, at first step of the processes, a control section 12 causes both the first and second light sources 62a and 62b of the color image input apparatus 100 to be turned on so that the document is irradiated, at same time, with light emitted from them, and then causes the CCD element 64 to detect light coming from the document so as to create image data $R_{UV}$, $G_{UV}$, $B_{UV}$, UV (S11).

After the step S11, the control section 12 causes an A/D conversion section 21 of the color image processing apparatus 200 to perform an A/D conversion process for the image data $R_{UV}$, $G_{UV}$, $B_{UV}$, UV (S12). After this, the control section 12 causes a shading correction section 22 to perform shading correction for the image data $R_{UV}$, $G_{UV}$, $B_{UV}$, UV (S13), and then causes a segmentation section 23 to perform a segmentation process for the image data $R_{UV}$, $G_{UV}$, $B_{UV}$, UV (S14). Subsequently, the control section 12 causes an input tone correction section 24 to perform an input tone correction process for the image data $R_{UV}$, $G_{UV}$, $B_{UV}$, UV (S15).

After the step S15, the control section 12 causes a color correction section 25 to perform a color correction process for the image data $R_{UV}$, $G_{UV}$, $B_{UV}$, UV (S16). A detail of the color correction process is described as follows. A recording means (which is not shown) stores color correction table which associates in advance (i) sets of values $R_{UV}$, $G_{UV}$, $B_{UV}$, UV with (ii) color corrected CMYK values. The control section 12 causes the color correction section 25 to read out color corrected CMYK values from the color correction table in accordance with the set of values $R_{UV}$, $G_{UV}$, $B_{UV}$, UV obtained in the step S1, so as to determine an output value. Then, the color correction section 25 outputs the output value to a spatial filter process section 26.

FIG. 10 is a view showing examples of how the sets of values $R_{UV}$, $G_{UV}$, $B_{UV}$ are associated with the color corrected CMYK values in the color correction table.

In a case where the image on the document is a normal image containing no fluorescent component, ultraviolet wavelength light emitted from the second light source 62b is directly reflected by the document to be incident on the UV light receiving element CCD_UV. Thus, as shown in FIG. 10, a detection value of the UV light receiving element CCD_UV is of a maximum value (which is 200 in FIG. 10). On the other hand, in a case where the image on the document is a fluorescent image containing a fluorescent component, ultraviolet wavelength light emitted from the second light source 62b to be incident on the document is converted into visible wavelength light, in the fluorescent image on the document, and the converted visible wavelength light is outputted. By this, a detection value of the UV light receiving element CCD_UV is smaller than the maximum value (which is 200 in FIG. 10). In this case, influence of the converted visible wavelength light is reflected in detection values of the R, G, and B light receiving elements CCD_R, CCD_G, and CCD_B.

Thus, in the present embodiment, a variety of fluorescent images (sample images) are read out by irradiating them with lights emitted from the first and second light sources 62a and 62b. Regarding values $R_{UV}$, $G_{UV}$, $B_{UV}$, UV of read out image data, relationships with CMYK values for allowing good color reproduction of the fluorescent images are determined through experiments in advance. Then, the color correction table is created, based on the relationships, and stored in advance in a storage section (which is not shown) provided in the color image processing apparatus 200. Thus, by performing a color correction process in accordance with the color correction table, it is possible to realize good color reproduction of any fluorescent image.

After the step S16, the control section 12 causes the spatial filter process section 26 to perform a spatial filter process of the output value (S17), and then the zoom process section 27 to perform a zoom process of the output value (S18). Subsequently, the control section 12 causes the intermediate process section 28 to perform an intermediate process of the output value (S19). After the step S19, the control section 12 finishes the process.

In the example shown in FIG. 10, the present embodiment is described as to a case in which there are performed, at one time, (i) the color correction process in which the input values $R_{UV}$, $G_{UV}$, $B_{UV}$, UV are converted into the CMYK output values with the use of the color correction table, and (ii) black generation and under color removal process. However, the present embodiment is not limited to this. For example, the input values $R_{UV}$, $G_{UV}$, $B_{UV}$, UV can be converted into CMY output values at first, and then the CMY output values can be converted into CMYK output values (black generation and under color removal process).

As discussed earlier, the copying machine 10 of the present embodiment includes the first light source 62a for emitting visible light, the second light source 62b for emitting ultraviolet light, and the CCD element 64. The CCD element 64 includes the light receiving elements each for receiving corresponding R, G, or B light and converting it into an electric signal, and the light receiving element for receiving UV (ultraviolet light) and converting it into an electric signal. In the present embodiment, color corrected output values are determined, based on sets of values $R_{UV}$, $G_{UV}$, UV of image data which are obtained by irradiating a document, at same time, with light emitted from the first and second light sources 62a and 62b.

By this, intensity of light which has been converted from ultraviolet wavelength light into visible wavelength light in the fluorescent image is reflected in image data composed of the values $R_{UV}$, $G_{UV}$, $B_{UV}$, UV. Thus, by determining output value of color corrected image data in accordance with it, it is possible to improve reproducibility of the fluorescent image. Furthermore, at time when the image reading is performed, one light emission from the light sources is satisfactory. Thus, it is possible to achieve reduction of time required for the image reading process, as compared to techniques as disclosed in Patent Literatures 3 and 4 which have to perform steps of irradiating an object with visible light and irradiating it with ultraviolet light.

In the embodiments, sections (blocks) of the copying machine 10, e.g., sections of the control section 12 and the color image processing apparatus 200, can be realized by software by using a processor such as CPU or the like. In this case, the copying machine 10 includes CPU (central processing unit) that executes the order of a control program for realizing the aforesaid functions, ROM (read only memory) that stores the control program, RAM (random access memory) that develops the control program in an executable form, and a storage device (storage medium), such as memory, that stores the control program and various types of data therein. With this arrangement, the object of the present invention is realized by a predetermined storage medium. The storage medium stores, in a computer-readable manner, program codes (executable code program, intermediate code program, and source program) of the control program of the copying machine 10, which is software for realizing the aforesaid functions. The storage medium is provided to the copying machine 10. With this arrangement, the copying machine (alternatively, CPU or MPU) 10 as a computer reads out and executes program code stored in the storage medium provided.

The storage medium may be tape based, such as a magnetic tape or cassette tape; disc based, such as a magnetic disk including floppy (trademark registered) disc and hard disk, and optical disk including CD-ROM, MO, MD, DVD, and CD-R; card based, such as an IC card (including a memory card) and an optical card; or semiconductor memory based, such as mask ROM, EPROM, EEPROM, and flash ROM.

Further, the copying machine 10 may be arranged so as to be connectable to a communications network so that the program code is supplied to the microscope through the communications network. The communications network is not particularly limited. Examples of the communications network include the Internet, intranet, extranet, LAN, ISDN, VAN, CATV communications network, virtual private network, telephone network, mobile communications network, and satellite communications network. Further, a transmission medium that constitutes the communications network is not particularly limited. Examples of the transmission medium include (i) wired lines such as IEEE 1394, USB, power-line carrier, cable TV lines, telephone lines, and ADSL lines and (ii) wireless connections such as IrDA and remote control using infrared light, Bluetooth (trademark registered), 802.11, HDR, mobile phone network, satellite connections, and terrestrial digital network. Note that the present invention can be also realized by the program codes in the form of a computer data signal embedded in a carrier wave which is embodied by electronic transmission.

Sections of the copying machine 10 are not limited to those realized by software. Alternatively, they can be constituted by hardware logic or a combination of hardware for executing a part of processes and computing means for executing software which performs control of the hardware or remaining processes.

In order to attain the object, an image reading apparatus of the present invention is An image reading apparatus for reading out an image on a document so as to create image data from it, the image reading apparatus including: a first light source for irradiating the document with visible light; a second light source for irradiating the document with ultraviolet light; a light receiving section for receiving (i) light reflected by the document after being emitted from the first light source and (ii) light reflected by the document after being emitted from the second light source, so as to convert the lights (i) and (ii) to single set of image data or respective sets of image data; a color correction section for performing a color correction process for the single set of image data or the respective sets of image data read out in the light receiving section; and a storage section for storing a color correction table for use in the color correction process, the color correction table associating in advance (a) image data, which correspond to image data that will be read out in the light receiving section by irradiating the document with both the visible light and the ultraviolet light at same time, with (b) color corrected image data for reproducing the image, and the color correction section being configured to perform the color correction process by reading out, from the color correction table, the color corrected image data for the image data that have been read out in the light receiving section by irradiating the document with both the visible light and the ultraviolet light at the same time.

The image reading apparatus configured as such includes: the first light source for irradiating a document with visible light; the second light source for irradiating the document with ultraviolet light; the light receiving section for receiving (i) light reflected by the document after being emitted from the first light source and (ii) light reflected by the document after being emitted from the second light source, so as to convert the lights (i) and (ii) into image data; the color correction section for treating the image data with the color correction process; and the storage section for storing the color correction table for use in the color correction process. The color correction table associates in advance (a) image data, which are read out in the light receiving section by irradiating the document with both the visible light and the ultraviolet light at the same time, with (b) color corrected image data for reproducing the image. The color correction section performs the color correction process by reading out, from the color correction table, the color corrected image data for the image data that have been read out in the light receiving section by irradiating the document with both the visible light and the ultraviolet light at the same time. In the image reading apparatus configured as such, in a case where the image on the document has a fluorescent image, light incident on the fluorescent image is converted from the ultraviolet wavelength light into visible wavelength light. Intensity of the light converted as such is to be reflected in image data that are created from the received lights in the light receiving section. Thus, by taking this into account, the color correction table is prepared in such a manner that the image on the document is accurately reproduced. Then, the image data are treated with the color correction process in accordance with the color correction table, so that even in a case where the image on the document contains the fluorescent image, it is possible to easily and accurately reproduce the image on the document.

The image reading apparatus of the present invention can be configured so that: the color correction table associates in advance (i) a combination of image data, which correspond to image data that will be read out in the light receiving section by irradiating the document with both the visible light and the ultraviolet light at same time, and image data, which correspond to image data that will be read out in the light receiving section by irradiating the document with the visible light only, with (ii) color corrected image data for reproducing the image; and the correction section performs the color correction process by reading out, from the color correction table, the color corrected image data for a combination of (a) the image data that have been read out in the light receiving section by irradiating the document with both the visible light and the ultraviolet light at the same time, and (b) the image data that have been read out in the light receiving section by irradiating the document with the visible light only.

In the image reading apparatus configured as such, in a case where the image on the document contains a fluorescent image, light incident on the fluorescent image is converted from the ultraviolet wavelength light to visible wavelength light. Intensity of the light converted as such has its light intensity reflected in image data that are read out in the light receiving section by irradiating the document with both the visible light and the ultraviolet light at the same time. However, in the image data read out in the light receiving section by irradiating the document with the visible light only, no light intensity of such converted light is reflected. By taking this into account, there is prepared the color correction table which associates in advance (i) the combination of image data, which correspond to image that will be read out in the light receiving section by irradiating the document with both the visible light and the ultraviolet light at the same time, and image data, which correspond to image data that will be read out in the light receiving section by irradiating the document with the visible light only, with (ii) the color corrected image data for allowing accurate reproduction of the image. Then, the color corrected image data for a combination of (a) the image data that have been read out in the light receiving section by irradiating the document with both the visible light and the ultraviolet light at the same time and (b) the image data that have been read out in the light receiving section by irradiating the document with the visible light only are read out from the color correction table, so that even in a case where the image on the document contains a fluorescent image, it is possible to accurately reproduce the image on the document.

Furthermore, the image reading apparatus of the present invention can be configured so that: the light receiving section includes: visible light receiving elements each for receiving corresponding color visible wavelength light so as to convert it to image data; and an ultraviolet light receiving element for receiving ultraviolet wavelength light so as to convert it to image data; the color correction table associates in advance (i) image data, which correspond to image data that will be read out in the light receiving section by irradiating the document with both the visible light and the ultraviolet light at same time, with (ii) color corrected image data for reproducing the image; and the color correction section performs the color correction process by reading out, from the color correction table, the color corrected image data for the image data that have been read out in the light receiving section by irradiating the document with both the visible light and the ultraviolet light at the same time.

In the image reading apparatus configured as such, the light receiving section includes: the visible light receiving elements each for receiving corresponding color visible wavelength light so as to convert it to image data; and the ultraviolet light receiving element for receiving ultraviolet wavelength light so as to convert it to image data. Thus, in the image data read out in the light receiving section by irradiating the document with the visible light and the ultraviolet light at same time, influence of the fluorescent image is reflected. By taking this into account, there is prepared the color correction table which associates in advance (i) image data, which correspond to image data that will be read out in the light receiving section by irradiating the document with the visible light and the ultraviolet light at the same time, with (ii) color corrected image data for allowing accurate reproduction of the image. Then, the color corrected image data for the image data that have been read out in the light receiving section by irradiating the document with both the visible light and the ultraviolet light at the same time are read out from the color correction table, so that even in a case where the image on the document contains a fluorescent image, it is possible to easily and accurately reproduce the image on the document.

Furthermore, the image reading apparatus of the present invention can be configured so that the ultraviolet light receiving element has a larger light receiving area for receiving the ultraviolet wavelength light, than a light receiving area of any of the visible light receiving elements for receiving corresponding color visible wavelength lights.

With the configuration, it is possible that light-receiving sensitivity to the ultraviolet wavelength light be improved. Thus, it is possible that influence of the fluorescent image be detected with higher accuracy.

An image data output processing apparatus of the present invention includes: any of the image reading apparatuses described so far; and an image output section for performing an output process of image data for which the color correction process has been performed in the image reading apparatus. The output process can be, for example, a process for forming an image on a recording material in accordance with the image data, a process for causing a display device to display an image in accordance to the image data, a process for sending the image data to another apparatus than the image reading apparatus, or a process for storing the image data in a predetermined storage destination.

With the configuration, it is possible that the output process of image data accurately reproduced in the image reading apparatus be performed. Thus, it is possible that an image faithful to the image on the document be outputted.

An image reading method of the present invention is an image reading method for reading out an image on a document so as to create image data from it, the image reading method including: a light receiving step of receiving (i) light reflected by the image after being emitted from a first light source for irradiating the document with visible light and (ii) light reflected by the image after being emitted from a second light source for irradiating the document with ultraviolet light, so as to convert the lights (i) and (ii) to a single set of image data or respective sets of image data; and a color correction step of performing a color correction process for the single set of image data or the respective sets of image data read out in the light receiving step, the color correction step performing reading out color corrected image data from a color correction table so as to perform the color correction process, the color correction table associating in advance (a) image data, which correspond to image data that will be read out in the light receiving step by irradiating the document with both the visible light and the ultraviolet light at same time, with (b) color corrected image data for reproducing the image.

The image reading method arranged as such includes: the light receiving step of receiving (i) light reflected by a document after being emitted from the first light source for irradiating the document with the visible light and (ii) light reflected by the document after being emitted from the second light source for irradiating the document with the ultraviolet light, so as to convert the lights (i) and (ii) into a single set of image data or respective sets of image data; and the color correction step of performing the color correction process for the image data. The color correction step reads out color corrected image data from the color correction table so as to perform the color correction process, the color correction table associating in advance (a) image data, which correspond to image that will be read out in the light receiving step by irradiating the document with both the visible light and the ultraviolet light at the same time, with (b) color corrected image data for allowing accurate reproduction of the image. In the image reading method arranged as such, in a case where the image on the document contains a fluorescent image, light incident on the fluorescent image is converted from the ultraviolet wavelength light into visible wavelength light. Intensity of the light converted as such is to be reflected in image data that are created in the light receiving step. Thus, by taking this into account, the color correction table is prepared in advance in such a manner that the image on the document can be accurately reproduced. Then, the image data are treated with the color correction process in accordance with the color correction table, so that even in a case where the image on the document has the fluorescent image, it is possible to easily and accurately reproduce the image on the document.

The present invention is not limited to the description of the embodiments above, but may be altered by a skilled person within the scope of the claims. An embodiment based on a proper combination of technical means as disclosed in different embodiments is encompassed in the technical scope of the present invention.

INDUSTRIAL APPLICABILITY

The present invention is applicable to an image reading apparatus and an image reading method, each for reading out an image on a document so as to create image data from it.

REFERENCE SIGNS LIST

10. Copying machine (image reading device, image data output processing device)
11. Operation panel
12. Control section
25. Color correction section
62. Light source
62a. First light source
62b. Second light source
64. CCD device (light receiving section)
100. Color image inputting device
200. Color image processing device
300. Color image outputting device (image outputting section)
CCD_R, CCD_G, CCD_B. Light receiving elements (visible light receiving elements)
CCD_UV. Light receiving device (ultraviolet light receiving device)

The invention claimed is:

1. An image reading apparatus for reading out an image on a document so as to create image data of the document, the image reading apparatus comprising:
   a first light source for irradiating the document with visible light;
   a second light source for irradiating the document with ultraviolet light;
   a light receiving section for receiving (i) light reflected by the document after being emitted from the first light source and (ii) light reflected by the document after being emitted from the second light source, so as to convert the lights (i) and (ii) to single set of image data or respective sets of image data;
   a color correction section for performing a color correction process for the single set of image data or the respective sets of image data read out in the light receiving section; and
   a storage section for storing a color correction table for use in the color correction process,
   the color correction table associating in advance (a) image data, which correspond to image data that will be read out in the light receiving section by irradiating the document with both the visible light and the ultraviolet light at same time, with (b) color corrected image data for reproducing the image, and
   the color correction section being configured to perform the color correction process by reading out, from the color correction table, the color corrected image data for the image data that have been read out in the light receiving section by irradiating the document with both the visible light and the ultraviolet light at the same time.

2. The image reading apparatus as set forth in claim 1, wherein:
   the color correction table associates in advance (i) a combination of image data, which correspond to image data that will be read out in the light receiving section by irradiating the document with both the visible light and the ultraviolet light at same time, and image data, which correspond to image data that will be read out in the light receiving section by irradiating the document with the visible light only, with (ii) color corrected image data for reproducing the image; and
   the correction section performs the color correction process by reading out, from the color correction table, the color corrected image data for a combination of (a) the image data that have been read out in the light receiving section by irradiating the document with both the visible light and the ultraviolet light at the same time, and (b) the image data that have been read out in the light receiving section by irradiating the document with the visible light only.

3. The image reading apparatus as set forth in claim 1, wherein:
   the light receiving section includes:
   visible light receiving elements each for receiving corresponding color visible wavelength light so as to convert it to image data; and
   an ultraviolet light receiving element for receiving ultraviolet wavelength light so as to convert it to image data;
   the color correction table associates in advance (i) image data, which correspond to image data that will be read out in the light receiving section by irradiating the document with both the visible light and the ultraviolet light at same time, with (ii) color corrected image data for reproducing the image; and
   the color correction section performs the color correction process by reading out, from the color correction table, the color corrected image data for the image data that have been read out in the light receiving section by irradiating the document with both the visible light and the ultraviolet light at the same time.

4. The image reading apparatus as set forth in claim 3, wherein:
   the ultraviolet light receiving element has a larger light receiving area for receiving the ultraviolet wavelength light, than a light receiving area of any of the visible light receiving elements for receiving corresponding color visible wavelength lights.

5. An image data output processing apparatus, comprising:
   an image reading apparatus for reading out an image on a document so as to create image data of the document, the image reading apparatus including:
   a first light source for irradiating the document with visible light;
   a second light source for irradiating the document with ultraviolet light;
   a light receiving section for receiving (i) light reflected by the document after being emitted from the first light source and (ii) light reflected by the document after being emitted from the second light source, so as to convert the lights (i) and (ii) to single set of image data or respective sets of image data;
   a color correction section for performing a color correction process for the single set of image data or the respective sets of image data read out in the light receiving section; and
   a storage section for storing a color correction table for use in the color correction process,
   the color correction table associating in advance (a) image data, which correspond to image data that will be read out in the light receiving section by irradiating the document with both the visible light and the ultraviolet light at same time, with (b) color corrected image data for reproducing the image, and
   the color correction section being configured to perform the color correction process by reading out, from the color correction table, the color corrected image data for the image data that have been read out in the light receiving section by irradiating the document with both the visible light and the ultraviolet light at the same time; and
   an image output section for performing an output process of image data for which the color correction process has been performed in the image reading apparatus.

6. An image reading method for reading out an image on a document so as to create image data of the document, the image reading method comprising:

a light receiving step of receiving (i) light reflected by the image after being emitted from a first light source for irradiating the document with visible light and (ii) light reflected by the image after being emitted from a second light source for irradiating the document with ultraviolet light, so as to convert the lights (i) and (ii) to a single set of image data or respective sets of image data; and a color correction step of performing a color correction process for the single set of image data or the respective sets of image data read out in the light receiving step, the color correction step performing reading out color corrected image data from a color correction table so as to perform the color correction process, the color correction table associating in advance (a) image data, which correspond to image data that will be read out in the light receiving step by irradiating the document with both the visible light and the ultraviolet light at same time, with (b) color corrected image data for reproducing the image.

* * * * *